United States Patent [19]

Noda et al.

[11] Patent Number: 4,710,298

[45] Date of Patent: Dec. 1, 1987

[54] AUXILIARY FOR DEWATERING OF SLUDGE

[75] Inventors: Kimihiko Noda, Uji; Yoji Fujiura, Kyoto; Yoichi Hasegawa, Joyo, all of Japan

[73] Assignee: Sanyo Chemical Industries, Ltd., Kyoto, Japan

[21] Appl. No.: 812,886

[22] PCT Filed: Apr. 24, 1984

[86] PCT No.: PCT/JP84/00214

§ 371 Date: Dec. 3, 1985

§ 102(e) Date: Dec. 3, 1985

[87] PCT Pub. No.: WO85/04857

PCT Pub. Date: Nov. 7, 1985

[51] Int. Cl.$^4$ .............................................. B01D 39/04
[52] U.S. Cl. ..................................... 210/505; 210/728; 264/118; 264/122; 264/DIG. 48; 264/DIG. 69
[58] Field of Search ............... 210/609, 714, 725, 727, 210/728, 734, 778, 505, 508, 500.1, 502.1, 504; 162/159, 168.3; 252/60, 180; 264/118, 122, DIG. 48, DIG. 69; 523/222

[56] References Cited

U.S. PATENT DOCUMENTS

| | | | |
|---|---|---|---|
| 3,158,532 | 11/1964 | Pall et al. | 210/504 |
| 3,194,727 | 7/1965 | Adams et al. | 162/168.3 |
| 3,242,073 | 3/1966 | Guebert et al. | 210/504 |
| 3,259,570 | 7/1966 | Priesing et al. | 210/53 |
| 3,509,021 | 4/1970 | Woodward | 162/168.3 |
| 3,951,792 | 4/1976 | Azorlosa et al. | 210/728 |
| 4,104,160 | 8/1978 | Wegmuller et al. | 210/502.1 |
| 4,152,307 | 5/1979 | Shibahara et al. | 260/29.6 HN |
| 4,290,988 | 9/1981 | Nopper et al. | 264/118 |
| 4,481,115 | 11/1984 | Wade et al. | 210/778 |
| 4,488,969 | 12/1984 | Hou | 210/679 |
| 4,559,143 | 12/1985 | Asada et al. | 210/778 |

FOREIGN PATENT DOCUMENTS

| | | | |
|---|---|---|---|
| 2250610 | 4/1974 | Fed. Rep. of Germany | 210/609 |
| 51-2244 | 1/1976 | Japan | 210/778 |
| 53-12573 | 2/1978 | Japan | 210/508 |
| 60-222118 | 10/1985 | Japan | 210/609 |
| 862719 | 3/1961 | United Kingdom . | |
| 2058035 | 4/1981 | United Kingdom . | |

OTHER PUBLICATIONS

Kirk-Othmer Encyclopedia of Chemical Technology, 2nd ed., vol. 18, pp. 688–689.

*Primary Examiner*—Peter Hruskoci
*Attorney, Agent, or Firm*—Wenderoth, Lind & Ponack

[57] ABSTRACT

Dewatering of sludge is accomplished by adding an organic fibrous material having the bulk specific gravity increased by being pressed or being wetted with water and a high molecular weight flocculant to the sludge, adjusting the resulting flocs to a diameter of not more than 1 mm, and subjecting the flocs to vacuum or pressure filtration.

14 Claims, No Drawings

AUXILIARY FOR DEWATERING OF SLUDGE

FIELD OF THE INVENTION

This invention relates to an auxiliary for the dewatering of a sludge, a method for the use thereof, and a method for the manufacture thereof.

BACKGROUND OF THE INVENTION

As means of aiding in the dewatering of sludge, the practice of using a high molecular weight flocculant and fibers such as, for example, fibers of pulp or sawdust in their simply mixed manner has been known to the art. This mixed auxiliary is inferior to an inorganic flocculant in terms of water content in the cake formed during the dewatering operation and ease of separation of the cake from the filter cloth. It further has the disadvantage that the use of the mixed auxiliary entails much time and labor, necessitates provision of large facilities for storage and transportation, and fails to manifest a stable effect.

DISCLOSURE OF THE INVENTION

The inventors have made a diligent study in search of a solution to the problem mentioned above and, consequently, completed this invention. Specifically, this invention relates to an auxiliary for the dewatering of sludge which comprises at least one organic fibrous material having the bulk specific gravity thereof increased to at least 0.3 g/cm$^3$ in density by pressing or by wetting with water, and at least one high molecular weight flocculant, and to a method for dewatering sludge with the auxiliary by the steps of adding the auxiliary to the sludge and adjusting the consequently formed flocs to a diameter not exceeding 1 mm.

Examples of the organic fibrous materials usable in this invention (hereinafter referred to simply as "fiber") include natural fibers (plant fibers, i.e. cellulosic fibers such as pulp, cotton, sawdust, straw and grass peat, and animal fibers such as silk and wool), man-made fibers (i.e. cellulosic fibers such as rayon and acetate), synthetic fibers (such as polyamide, polyester, and acryls), and mixtures thereof. Among these, cellulosic plant fibers (such as paper, sawdust, cotton, straw, pulp, and grass peat) are desirable selections; and plant fibrous materials, in the form of fiber or capable of assuming a fibrous state in water, are more desirable selections. Paper (waste-paper such as, for example, waste-newspapers), particularly crushed paper, proves to be desirable. The crushed paper in a state containing uncrushed fragments of paper (1 to 50 mm in size, for example) not in a predominant proportion can be used as a fiber.

Optionally, the crushed paper may be used in combination with some other organic fibrous materials (hereinafter referred to as "fiber"). The ratio of the crushed paper to the other fiber in this case falls generally in the range of 100:0 to 1:99, preferably in the range of 100:0 to 50:50.

The fiber is usable in various forms such as, for example, powder, fibrous particles represented by chopped filaments (generally not more than 100 deniers in thickness), fiber piece obtained by bundling a plurality of fibers, treating the produced bundle with a suitable cohesion agent, and cutting the bound bundle in a suitable size, fiber pieces obtained by bundling a plurality of fibers, twisting the produced bundle into a thread-like bundle and cutting the thread-like bundle in a suitable size, cut pieces of woven fabric, non-woven fabric, and knit fabric, and loose fibers obtained by untwisting such fabrics. Although the length of the fiber is not specifically defined, it falls generally in the range of 0.01 to 50 mm, preferably in the range of 0.1 to 30 mm.

As the high molecular weight flocculant, cationic, anionic, and nonionic high molecular weight flocculants are usable. Use of a cationic high molecular weight flocculant proves particularly desirable.

Among the cationic high molecular flocculants suitable for use in this invention are included polymers and copolymers of at least one cationic monomer or a combination thereof with at least one other ethylenically unsaturated monomer.

Concrete examples of the cationic monomer include cationic acrylic monomers such as tertiary nitrogen-containing acrylates, tertiary nitrogen-containing acrylamides, quaternary nitrogen-containing acrylates, and quaternary nitrogen-containing acrylamides; heterocycle- or aromatic cycle-containing vinyl monomers such as vinyl imidazoolines, vinyl pyridines, and vinylbenzyl quaternary ammonium salts; and allylamines.

In the cationic acrylic monomers are embraced those represented by the general formula:

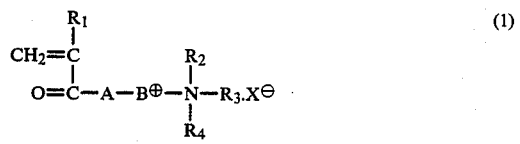

(wherein A stands for an oxygen atom or NH, B for an alkylene group of 1 to 4 carbon atoms, a hydroxyalkylene group of 2 to 4 carbon atoms, or a phenylene group, $R_1$ for a hydrogen atom or a methyl group, $R_2$, $R_3$, and $R_4$ independently for a hydrogen atom, an alkyl group, or an aralkyl group, and $X^\ominus$ for a counter anion).

Concrete examples of the cationic acrylic monomer of the general formula are inorganic acid salts (such as hydrochlorides and sulfates), organic acid salts (such as acetates), and quaternary ammonium salts (using quaternizing agents such as methyl chloride, dimethyl sulfate, and benzyl chloride) of dialkylaminoalkyl (meth)acrylates [such as dimethylaminoethyl (meth)acrylate, diethylaminoethyl (meth)acrylate, 3-dimethylamino-2-hydroxypropyl (meth)acrylate] and dialkylaminoalkyl (meth)acrylamides [such as dimethylaminoethyl (meth)acrylamide and 3-dimethylamino-2-hydroxypropyl acrylamide].

Specifically, the vinyl imidazolines includes N-vinyl imidazoline and tertiary and quaternary salts thereof; the vinyl pyridines include 2-vinyl pyridine, 3-vinyl pyridine, N-vinyl pyridine, and tertiary and quaternary salts thereof; the vinylbenzyl quaternary ammonium salts include vinylbenzyl tri-$C_{1-4}$ alkyl ammonium salts such as those disclosed in the specification of British Pat. No. 862,719; and the allylamines include (meth)allylamines (denoting allylamine and methallylamine collectively; which expression will be similarly used hereinafter in the specification) and mono- and di-$C_{1-4}$ alkyl substitution products thereof, di(meth)allylamines and alkyl substitution products thereof, and quaternized products of these alkyl-substituted (meth)allylamine.

Concrete examples of the other ethylenically unsaturated monomer optionally copolymerized with the aforementioned cationic monomer are nonionic monomers such as (meth)acrylamides, N-mono and N,N-di $C_{1-4}$ alkyl (meth)acrylamides, (meth)acrylonitriles, $C_{1-4}$ alkyl (meth)acrylates, styrene, vinyl esters (such as vinyl acetate), vinyl ethers (such as vinylmethyl ether), and vinyl halides (such as vinyl chloride) and anionic monomers such as unsaturated carboxylic acids [such as (meth)acrylic acids and maleic acid], unsaturated sulfonic acids [such as aliphatic sulfonic acids including vinyl sulfonic acid and (meth)allyl sulfonic acids, aromatic vinyl sulfonic acids including vinyl toluenesulfonic acid and styrene sulfonic acid, sulfo(meth)acrylates including sulfo $C_{2-4}$ alkyl (meth)acrylates, and 2-hydroxy-3-(meth)acryloxypropane sulfonic acids, and sulfo(meth)acrylamides including (meth)acrylamide $C_{2-4}$ alkane sulfonic acid and 3-(meth)acrylamide-2-hydroxypropane sulfonic acid] and salts thereof [such as alkali methal (Na, K, etc.) salts, ammonium salts, and amine salts including mono-, di-, and tri-ethanolamines and alkyl($C_{1-4}$) amines.

The proportion of the cationic monomer is generally at least 5%, desirably at least 10%, and particularly desirably at least 30%, based on the weight of all the monomers involved. The proportion of the (meth)acrYlamide is generally in the range of 0 to 95%, preferably in the range of 0 to 70%. The proportion of the anionic and hydrophobic monomer is generally not more than 20%, preferably not more than 10%.

Concrete examples of the polymer and the copolymer of the cationic monomer optionally with some other monomer are found among those disclosed in the U.S. Pat. Nos. 4,152,307 and 3,259,570.

Other examples of the cationic high molecular weight flocculants are cationically modified polyacrylamides, chitosan, polyethyleneimines, and epihalohydrin-amine condensates and cationized starches. Specific examples of cationically modified polyacrylamides are Mannich modification products (such as disclosed in the specification of U.S. Pat. No. 2,328,901) and Hofmann modification products of polyacrylamides. Examples of the polyethyleneimine are polyethyleneimines of polymerization degrees of 400 or more, preferably 2,000 or more, N-methyl substitution products thereof, and tertiary and quaternary salts of these (such as those disclosed in the specification of U.S. Pat. No. 3,259,570). Specific examples of the epihalohydrin-amine condensates are polycondensates of epichlohydrin with an alkylenediamine of two to six carbon atoms. Specific examples of the cationized starches are cationic starches, disclosed in the Encyclopedia of Chemical Technology (2nd edition), Vol. 18, pp 688-689. Specific examples of the chitosan are products obtained by heating chitins, present in shells of crabs, prawns and insects in a concentrated alkali thereby hydrolyzing to deacetylate them.

Among the cationic high molecular weight flocculants enumerated above, preferred are those whose intrinsic viscosity, [η] dl/g (hereinafter expressed as [η]), and colloidal equivalent value, C meg/g (hereinafter expressed as C) fall within the range represented by the following formula:

$$6 - C \leq [\eta] \leq 11 - C \quad (2)$$

(wherein C> zero and [η] > zero and [η] is measured in an aqueous 1N $NaNO_3$ solution at 3020 C.). If [η] deviates from the range mentioned above, the produced auxiliary produces no sufficient dewatering effect when it is added to and mixed with sludge for the purpose of dewatering.

Examples of the anionic high molecular weight flocculants and the nonionic high molecular weight flocculants are polymers and copolymers of the aforementioned nonionic monomers [such as (meth)acrylamides], anionic monomers [such as (meth)acrylic acids, (meth)acrylamide $C_{2-4}$ alkanesulfonic acids, and vinylsulfonic acid, and salts thereof] or combinations of two or more of them, and anionic modification products of these (co)polymers including polyacrylamides and hydrolyzates thereof; polyethylene oxide; and naturally occurring nonionic and anionic high molecular weight flocculants including sodium alginate, guayule gum, starch, carboxymethyl cellulose-sodium salt.

Among the high molecular weight flocculants, cationic high molecular weight flocculants prove particularly desirable. Among the cationic flocculants, preferred are salts of (co)polymers of tertiary nitrogen-containing (meth)acrylates or (meth)acrylamides with acids, (co)polymers of quaternary nitrogen-containing (meth)acrylates or (meth)acrylamides, Mannich modification products of polyacrylamides, polyvinyl imidazolines, chitosan, and polydiallylamines. A methacryloxyethyl-trimethylammonium chloride polymer is a more desirable selection.

The high molecular weight flocculant for use in the present invention is desired to be in a powdery form. It may be used when necessary in the form of an aqueous solution or emulsion (containing the flocculant in a concentration of not less than 2% by weight, less preferably not less than 20% by weight).

The proportions of the high molecular weight flocculant and the fiber to be used are not specifically defined but may be freely selected to suit the sludge to be dewatered. Their weight ratio falls generally in the range of 1:0.1 to 1:1,000, preferably in the range of 1:5 to 1:100. If the ratio of the fiber to the flocculant is less than 0.1, separability from the filter cloth of the cake resulting from the dewatering of sludge by the addition of the auxiliary is inferior. If the ratio exceeds 1,000, the auxiliary loses its economy. The amount of the fiber to be added based on the solids of the sludge falls generally in the range of 5 to 200%, preferably in the range of 10 to 100%, while that of the cationic high molecular weight flocculant (as solids) falls generally in the range of 0.05 to 2%, preferably in the range of 0.1 to 1.5%.

In the present invention, the organic fibrous material is used with the bulk specific gravity thereof increased to at least 0.3 g/cm³ in density by being pressed or wetted with water.

The fibrous material, before it is pressed or wetted with water, has a density generally not more than 0.1 g/cm³, preferably 0.01 to 0.05 g/cm³. By the pressing or the wetting with water, the fibrous material has the bulk specific gravity thereof increased generally by at least three times, preferably by 10 to 300 times.

The fibrous material may be pressed all by itself or as mixed with the high molecular weight flocculant. The pressing is desired to be carried out in the latter manner.

As means of mixing the fibrous materials (A) with the high molecular weight flocculant (B), there may be mentioned the method which mixes (A) and (B), both in a powdered form or fibrous form with a mechanical mixing device [such as a Nowter mixer (vertical screw), a ribbon mixer, a conical blender, or a mortar mixer], the method which comprises raking (A) off a fluff former with a raking device (such as a garnet roller) and blowing (B) in a powdered form with a sprinkle or spray device against the falling (A) thereby mixing (B) with (A) or superposing (B) on (A), and the method which comprises depositing (A) in a pulverized form on a sheet, sprinkling or spraying (B) or the mixture of (B) with pulverized (A) thereon, and superposing thereon pulverized (A) in the form of a sheet.

(A) alone or the mixture of (A) with (B) is pressed to a density of at least 0.3 g/cm$^3$. In due consideration of the economy of transportation and storage, this pressing is desired to be effected desirably to a density of at least 0.5 g/cm$^3$ and more desirably to at least 0.7 g/cm$^3$. If the density is less than 0.3 g/cm$^3$, the water content is not sufficiently lowered in the cake resulting from the dewatering of sludge by the addition of the auxiliary and the cake is not easily separated from the filter cloth.

As means of pressing the mixture, there may be cited the method which comprises pressing the mixture in a mold at room temperature thereby producing pellets, and the method which comprises pressing the mixture in the form of sheets, bars, or blocks at room temperature and subsequently cutting or crushing the sheets, bars, or blocks in a suitable size. The aforementioned pressing may be carried out under application of heat (such as 20° to 300° C., for example) in the presence of humidity (60 to 100%, for example).

The pressure exerted during the course of pressing has to be such that the pressed mixture will acquire a density of at least 0.3 g/cm$^3$. It can be properly selected to suit the kind, form, nature, etc. of the fiber. It falls generally in the range of 1 to 3,000 kg/cm$^3$, preferably in the range of 100 to 2,000 kg/cm$^3$. The pressing can be carried out by using a roll press, a hydraulic press, a screw press, etc.

The pressed mixture may be in any shape. Examples of the shape of the pressed mixture are spheres, cylinders, cubes, rectangular parallelopipeds, cones, prisms, and bars. The size of the pressed mixture is such that the finally produced pieces will have a minor diameter of generally not more than 10 cm, preferably not more than 3 cm. If the minor diameter is longer than 10 cm, the auxiliary added to the sludge is not so quickly dispersed as desired and the necessary dewatering of sludge cannot be sufficiently obtained quickly. The major diameter is not specifically defined. It is desired to be not more than 1 m and not less than 1 mm (preferably not less than 2 mm).

The pressed mixture obtained as described above is added to the sludge and used to aid in dewatering of sludge.

The component (A) may be wetted with water to have the bulk specific gravity thereof increased to at least 0.3 g/cm$^3$ in density instead of being pressed. The wetting of the component with water can be carried out by any of various known methods. For example, the method which consists in spraying (A) with water, the method which consists in blowing steam into (A), and the method which consists in holding (A) in an atmosphere of high humidity thereby allowing (A) to absorb moisture may be cited.

The increase of the density of (A) is obtained desirably by the method which comprises initially disintegrating (A) to a density of not more than 0.1 g/cm$^3$, preferably falling in the range of 0.01 to 0.05 g/cm$^3$, and pressing the produced particles in a dry state [water content of not more than 20% by weight, preferably not more than 15% by weight based on the water content of (A)], and the method which comprises wetting (A) with water thereby enabling the water content to reach a value in the range of 10 to 100% by weight, preferably 20 to 50% by weight, based on the weight of (A). If the water content obtained in consequence of the pressing exceeds 20% by weight or the water content obtained in consequence of the wetting with water exceeds 100% by weight, the fibers are entangled too heavily to produce desired dewatering effect.

The increase of the density of the mixture of (A) and (B) is desired, from the standpoint of the quality acquired by the produced auxiliary, to be carried out by the method which comprises initially disintegrating (A) to a density of not more than 0.1 g/cm$^3$, preferably falling in the range of 0.01 to 0.5 g/cm$^3$, mixing the resultant particles in a dry state (water content of not more than 20% by weight, preferably not more than 15% by weight based on (A)] with (B), and pressing the resultant mixture. In this case, (B) is desired to be used in a powdered form. From the standpoint of the quality to be acquired by the produced auxiliary, (B) in the form of a powder is desired particularly to have a particle size in the range of 20 to 200 mesh, preferably 32 to 100 mesh.

In the present invention, the auxiliary for dewatering which is composed of the fiber and the high molecular weight flocculant, when necessary, may be used in combination with, in an amount not prevalent over the fiber, other flocculant (an inorganic flocculant such as basic aluminum chloride, ferrous or ferric sulfate, ferric chloride, aluminum sulfate, sodium aluminate, or activated silicic acid), a known filter aid (such as slaked lime, finely powdered coal, bentonite, diatomaceous earth, kaolin, Celite, or activated clay), and a dispersant (such as surfactant or inorganic salt). As the surfactant, any of the known anionic, cationic, amphoteric, and nonionic surfactants can be used, although cationic and nonionic surfactants are desirable selections. Such cationic surfactants as primary through tertiary or quaternary ammonium salts of long-chain alkyl amines are still better selections. The inorganic salt is not specifically defined. It may be sodium chloride, sodium sulfate, or ammonium sulfate. The amount of such additives to be incorporated is not allowed to exceed 200% and is desired not to exceed 100%, based on the combined weight of the fiber and the flocculant. The additives may be added as mixed in advance with the auxiliary of this invention or they may be added separately in any desired order.

When the organic fibrous substance (A) having the bulk specific gravity thereof increased to at least 0.3 g/cm$^3$ by being pressed or being wetted with water, and the high molecular weight flocculant (B) are to be added to sludge in accordance with this invention, (A) and (B) may be added in a mixed form (particularly in a pressed form) or they may be added separately of each other in a desired order. In the latter case, (A) and (B) may be added at the same time or (A) is mixed with the sludge and (B) is added thereafter.

When the flocculant (B) is formed of two or more kinds of flocculants (a combination of a cationic flocculant and an anionic flocculant, for example), these component flocculants may be added separately in a desired order (anion followed by cation, or in the reverse order).

Examples of the sludge to which the auxiliary is added for effective dewatering include raw sludges, activated sludges, digested sludges; and flocculated or sedimented sludges, from sewage, night soil, industrial waste water, and the like, as well as mixtures of these sludges. The auxiliary is particularly effective in dewatering sparingly filtrable sludge which contains the sludge resulting from a treatment with a microorganism (activated sludge or digested sludge) and has an organic content of not less than 40% by weight based on solids in the sludge and an organic fiber content of not more than 20% by weight in the sludge.

In the present invention, the amount of the auxiliary to be added to the sludge is generally 5 to 200% by weight, desirably 10 to 100% by weight, and particularly desirably 10 to 60% by weight, based on the solids of the sludge. If the amount is less than 5%, the auxiliary is not sufficiently effective in dewatering the sludge. If it exceeds 200%, the auxiliary proves uneconomical.

As means of adding the auxiliary to the sludge, the method which consists in directly adding the auxiliary to the sludge and the method which comprises initially dispersing the auxiliary in water thereby producing a slurry and subsequently adding this slurry to the sludge may be cited. Optionally, a dispersant such as an inorganic salt or a surfactant may be added to the sludge before, after, or simultaneously with the addition of the auxiliary to the sludge so as to expedite the dispersion of the auxiliary in the sludge.

In the present invention, the auxiliary is added to the sludge and the flocs consequently formed are adjusted in diameter to not more than 1 mm, preferably in the range of 0.1 to 0.5 mm. If the diameter of flocs is larger than 1 mm, the water content of the cake resulting from the dewatering of sludge is not sufficiently low and the amount of the cake deposited on the filter cloth is small (and, consequently, the speed of sludge treatment is low). Thus, the object of this invention is not accomplished.

As means of adjusting the flocs in diameter, there may be mentioned a method which comprises directly adding the auxiliary to the sludge, mixing them by ordinary stirring or moderate stirring (at a rate of 30 rpm or less to 300 rpm for 10 to 1,000 seconds, for example) thereby giving rise to flocs, and subsequently subjecting the flocs to forced stirring (at a rate of 300 rpm or more for 10 to 1,000 seconds, for example) thereby breaking the flocs into particles of not more than 1 mm in diameter. The stirring (ordinary stirring, moderate stirring, or forced stirring) may be effected by any desired method (by the use of a two-bladed stirrer, a paddle type stirrer, or a Satake type stirrer) and is not specifically defined. When the flocs once formed are broken, the water content of the cake resulting from the dewatering of sludge is further lowered, the amount of the cake deposited on the filter cloth is increased (and, consequently, the speed of the sludge treatment is increased), and the ease of separation of the cake from the filter cloth is enhanced. The adjustment of flocs in diameter can otherwise be effected by the method which consists in adjusting the composition of the auxiliary, the amount of addition of the auxiliary, and the conditions of stirring (speed and duration of stirring) after the addition of the auxiliary in due consideration of the kind of the sludge to be treated, so that the treatment will give rise to flocs of not more than 1 mm in diameter.

After the flocs have been adjusted to a diameter of not more than 1 mm, they are subjected to dewatering. This dewatering is effected by the use of a vacuum filtering machine or pressure filtering machine.

Examples of the vacuum filtering machine include an Oliver filter, a belt filter, a drum filter, and a precoat filter.

The pressure filtering machine is only required to possess a mechanism capable of dewatering sludge under application of pressure. Examples are a filter press, a belt press, a caterpillar type roll press, and a screw press.

In all the filtering machines enumerated above, vacuum filtering machines and a filter press are desirable selections. When any of these desirable filtering machines is used, the cake obtained after the dewatering has a sufficient low water content and the ease of separation of the cake from the filter cloth is satisfactory.

Optionally, the sludge to which the auxiliary has been added may be given slight preliminary dewatering treatment with a gravitational dewatering machine or some other suitable dewatering machine and, thereafter, subjected to a treatment with the aforementioned dewatering machine.

The cake which has been dewatered is disposed of as by the known method of incineration. It can be very easily converted into fuel or compost (fertilizer).

When the organic fibrous materials having the bulk specific gravity thereof increased to at least 0.3 g/cm$^3$ in density by being pressed or being wetted with water, and the high molecular weight flocculant are added to sludge and the consequently produced flocs are adjusted in diameter to not more than 1 mm in accordance with the present invention, there is produced an unexpected effect of notably improving the efficiency of dewatering operation (lowered water content of the dewatered cake and improved ease of the separation of the cake from the filter cloth).

The striking effect of the present invention cannot be obtained when the aforementioned fibrous substance and high molecular weight flocculant are jointly used and the adjustment of the produced flocs to the diameter of not more than 1 mm is omitted, or when the aforementioned fibrous substance is not used or it is substituted by a fibrous substance having the bulk specific gravity thereof not increased as contemplated by this invention.

The pressed mixture of the flocculant and the fiber has a high density and, therefore, enjoys the advantage that it can be stored and transported efficiently and economically.

Further, it is capable of effecting necessary dewatering of sludge more efficiently (in terms of decrease of the water content of the cake resulting from the dewatering and improvement in the ease of separation of the cake from the filter cloth) than the conventional method of vacuum dewatering by the use of an inorganic flocculant. Moreover, it overcomes the salient drawback of the method using the inorganic flocculant. The cake finally produced exhibits flammability high enough to warrant a generous saving of fuel required for its incineration and a notable decrease in the amount of the residue of incineration. The dewatered cake can be easily converted into compost (fertilizer). Thus, this invention possesses a very high economic value.

PREFERRED EMBODIMENT OF THE INVENTION

Now, this invention will be described more specifically below with reference to working examples and comparative experiments. This invention is not limited to these working examples.

Example 1 and Comparative Experiment 1

A mass of crushed waste-newspapers (having a bulk specific gravity of 0.03 and a water content of 8% by weight) and powdered methacroyloxyethyl trimethyl ammonium chloride polymer (hereinafter referred to as "METAC polymer": $[\eta] = 5.5$ dl/g and C $= 4.8$ meg/g) were mixed in varying proportions indicated in Table 1. The mixture was pressed to 1,000 kg/cm² at room temperature with a hydraulic molding press to produce pellets (specific gravity 0.9) of a prescribed size as the auxiliary of this invention.

In a 300-ml beaker containing 200 g of mixed raw sludge taken from the sewage treatment plant of A City (solids content 2.9% by weight, organic content 69.2% by weight/solids of sludge, and fiber content 4.5% by weight/solids of sludge), the pellets prepared as described above were added. The sludge and the pellets were stirred at 250 rpm for 30 seconds with a laboratory stirrer provided with a paddle type stirring bar to give rise to flocs and then stirred at 500 rpm for two minutes to break the aforementioned flocs. A small leaf 3.5 cm in inside diameter fitted with a commercially available vacuum dewatering filter cloth was immersed in the beaker containing the flocs and put to use for vacuum filtration under a vacuum of $-450$ mmHg. The time of the vacuum filtration (in seconds) until the volume of filtrate amounted to 60 ml was measured. Then, the leaf was immediately taken out of the beaker, set in position upside down, and put to use for further suction under a vacuum of $-450$ mmHg for two minutes. The cake deposited on the filter cloth was measured in thickness (mm) and tested for water content (% by weight) and ease of separation from the filter cloth and the filtrate was tested for clarity. The results are shown in Table 1.

In comparative Experiment 1, the procedure of Example 1 was repeated while severally having nothing added to the sludge, having a mass of crushed waste-newspaper (specific gravity 0.03) added in its unmodified form to the sludge, having only the high molecular weight flocculant added to the sludge, having the crushed newspaper and the high molecular weight flocculant added not in a pelletized form but in a loose form to the sludge, and having ferric chloride and slaked lime added to the sludge in varying test runs. The results are also shown in Table 1. Other test runs were performed by following the procedure of Example 1, except that formed flocs were adjusted to diameters larger than the upper limit defined by this invention. The results are also given in Table 1.

TABLE 1

|  |  | Auxiliary for dewatering | | | Results of vaccuum dewatering test | | |
|---|---|---|---|---|---|---|---|
|  |  | Composition | | | | | |
|  |  | Dosage of crushed newspaper (% by weight, based on solids of sludge) | Dosage of METAC polymer (% by weight, based on solids of sludge) | Size of pellets (minor diameter, in cm) | Floc diameter (mm) | Time required for filtrating 60 ml of filtrate (sec.) | Thickness of dewatered cake (mm) |
| Example 1 | 1-1 | 40 | 0.6 | 0.2 | 0.3 | 34 | 17 |
|  | 1-2 | 20 | 0.6 | 0.2 | 0.3 | 39 | 15 |
|  | 1-3 | 10 | 0.6 | 0.2 | 0.3 | 43 | 14 |
|  | 1-4 | 20 | 1.2 | 0.2 | 0.5 | 36 | 15 |
| Comparative Experiment 1 | 1'-1 | — | — | — | 0.2> | 500< | Incapable of filtration |
|  | 1'-2 | 20 | — | — | 0.2> | 500< | |
|  | 1'-3 | — | 0.6 | — | 0.3 | 425 | 2 |
|  | 1'-4 | — | 1.2 | — | 0.5 | 418 | 2 |
|  | 1'-5 | 20 | 0.6 | — | 0.3 | 80 | 7 |
|  | 1'-6 | Ferric chloride, 10% by weight (based on solids of sludge) Slaked lime, 30% by weight (based on solids of sludge) | | | 0.2> | 50 | 13 |
|  | 1'-7 | 20 | 0.6 | 0.2 | 1.4 | 30 | No cake deposited on filter cloth |
|  | 1'-8 | 20 | 0.6 | 0.2 | 2.6 | 26 | |
|  | 1'-9 | 20 | 0.6 | 0.2 | 3.4 | 19 | |
|  | 1'-10 | 20 | 0.6 | 0.2 | 4.7 | 18 | |

|  |  | Results of vacuum dewatering test | | | |
|---|---|---|---|---|---|
|  |  | Water content of dewatered cake (% by weight) | Ease of separation of dewatered cake (*1) | Clarity of filtrate (*2) | Remarks |
| Example 1 | 1-1 | 70 | Good | Good | |
|  | 1-2 | 72 | Good | Good | |
|  | 1-3 | 77 | Good | Good | |
|  | 1-4 | 73 | Good | Good | |
| Comparative Experiment 1 | 1'-1 | | | | Added not in pelletized form but in loose form |
|  | 1'-2 | | | | |
|  | 1'-3 | 88 | Bad | Bad | |
|  | 1'-4 | 87 | Bad | Bad | |
|  | 1'-5 | 84 | Fair | Fair | |
|  | 1'-6 | 80 | Good | Good to fair | |
|  | 1'-7 | | | | |
|  | 1'-8 | | | | |
|  | 1'-9 | | | | |
|  | 1'-10 | | | | |

(*1) Ease of separation of dewatered cake
Good - Substantially complete separation of cake without clogging of filter cloth.
Fair - Incomplete separation of cake and a little cake being left on the filter cloth, with partial clogging of the filter cloth.
Bad - A fairly large amount of cake being left on the filter cloth after separation of cake, with clogging of substantially entire surface of the fiber cloth.
(*2) Clarity of filtrate
Good - Substantially no discernible leakage of cake.
Fair - Very slight leakage of cake in the filtrate.
Bad - Notable leakage of cake in the filtrate.

The footnotes, *1 and *2, apply to the following working examples and comparative experiments.

Example 2 and Comparative Experiment 2 the sludge, severally in various test runs. The results are shown in Table 2.

TABLE 2

| | | Composition of auxiliary | | METAC polymer | Results of vacuum dewatering test | | |
|---|---|---|---|---|---|---|---|
| | | Fiber | | | | | |
| | | Kind | Dosage, % by weight, based on solids of sludge | Dosage % by weight, based on solids of sludge | Floc diameter (mm) | Time required for filtrating 60 ml of filtrate (sec.) | Thickness of dewatered cake (mm) |
| Example 2 | 2-1 | Crushed waste-corrugated cardboard paper | 20 | 0.6 | 0.3 | 41 | 15 |
| | 2-2 | Cotton fiber | 20 | 0.6 | 0.3 | 43 | 15 |
| | 2-3 | Grass peat | 20 | 0.6 | 0.3 | 45 | 15 |
| | 2-4 | Grass peat | 10 | 0.6 | 0.3 | 40 | 15 |
| | | Crushed waste-newspaper | 10 | | | | |
| | 2-5 | Crushed waste-newspaper | 15 | 0.6 | 0.3 | 41 | 14 |
| | | Finely powdered coal | 5 | | | | |
| Comparative Experiment 2 | 2'-1 | Crushed waste-corrugated cardboard paper | 20 | — | 1> | 500< | Incapable of filtration |
| | 2'-2 | Grass peat | 20 | — | 1> | 500< | |
| | 2'-3 | — | — | 0.6 | 0.3 | 480 | 2 |
| | 2'-4 | Crushed waste-corrugated cardboard paper | 20 | 0.6 | 0.3 | 84 | 6 |
| | 2'-5 | Grass peat | 20 | 0.6 | 0.3 | 88 | 5 |

| | | | Results of vacuum dewatering test | | | |
|---|---|---|---|---|---|---|
| | | | Water content of dewatered cake (% by weight) | Ease of separation of dewatered cake (*1) | Clarity of filtrate (*2) | Remarks |
| Example 2 | 2-1 | | 73 | Good | Good | |
| | 2-2 | | 75 | Good | Good to fair | |
| | 2-3 | | 76 | Good | Good | |
| | 2-4 | | 73 | Good | Good | |
| | 2-5 | | 74 | Good | Good | |
| Comparative Experiment 2 | 2'-1 | | | | | |
| | 2'-2 | | | | | |
| | 2'-3 | | 89 | Bad | Bad | |
| | 2'-4 | | 83 | Fair | Fair | Added not in pelletized form but in loose form |
| | 2'-5 | | 85 | Fair | Fair | |

(*1), (*2) Same as in Table 1.

A varying organic fibrous substance (having bulk specific gravity of 0.02 to 0.07 and water content of 3 to 10% by weight) was pressed under linear pressure of 500 kg/cm with a roll type press to prepare a flat plate of 5 mm in thickness (having a bulk specific gravity of 0.5 to 1.2). This flat plate was cut with scissors into compressed pellets 1.5 cm in length, 1.5 cm in width, and 5 mm in thickness.

The pellets were added to a 300-ml beaker containing 200 g of the same sludge as used in Example 1. The pellets and the sludge were stirred with a laboratory stirrer provided with a paddle type stirring bar at a rate of 250 rpm for 30 seconds. Then, the resultant mixture and 11.6 ml of an aqueous 0.3% by weight of METAC polymer solution (METAC polymer content 0.6% by weight based on solids of the sludge) added thereto were stirred at a rate of 250 rpm for 30 seconds to give rise to flocs and subsequently stirred at a rate of 500 rpm for two minutes to break the aforementioned flocs.

Then, the same vacuum dewatering test as in Example 1 was performed. The results are shown in Table 2.

In Comparative Experiment 2, the procedure of Example 2 was repeated while having only the pellets of fiber added to the sludge, having only the METAC polymer added in the form of an aqueous 0.3% by weight solution to the sludge, and having an organic fibrous substance (having a water content of not more than 10%) of a bulk specific gravity of 0.02 to 0.07 added instead of the plate of the compressed pellets to

Example 3 and Comparative Experiment 3

One part by weight of crushed waste-newspaper (having bulk specific gravity of 0.03 and water content of 8% by weight) and 0.5 part by weight of water added thereto were thoroughly kneaded to increase the bulk specific gravity by about four times.

In a 300-ml beaker containing 200 g of digestive sludge taken from the excrement treatment plant of B City (having solids content of 3.9% by weight, organic content of 62.8% by weight/solids of sludge, and fiber content of 11.5% by weight/solids of sludge), the mixture prepared above and an aqueous solution of 0.3% by weight of METAC polymer were added in varying amounts indicated in Table 3. The sludge and the added mixture and aqueous solution were stirred at a rate of 250 rpm for 30 seconds with a laboratory stirrer provided with a paddle type stirring bar to give rise to flocs and then further stirred at a rate of 500 rpm for two minutes to break the aforementioned flocs. The flocs in the beaker were transferred into a small laboratory filter press fitted with a commercially available filter press cloth and dewatered under pressure of 10 kg/cm². The dewatering under pressure was stopped after three minutes of the operation to test the cake for water content (% by weight) and ease of separation from the filter cloth and to test the filtrate for clarity. The results are shown in Table 3.

In Comparative Experiment 3, the filter press test was conducted by following the procedure of Example 3 while having nothing added to the sludge, having only the aforementioned kneaded mixture added to the sludge, having only the aqueous solution of METAC polymer added to the sludge, and having crushed newspaper (having water content of 8%) with a bulk specific gravity of 0.03 added in its unmodified form to the sludge, severally in the various test runs. The results are shown in Table 3.

6. An auxiliary according to claim 5, wherein said cationic monomer is a monomer represented by the formula:

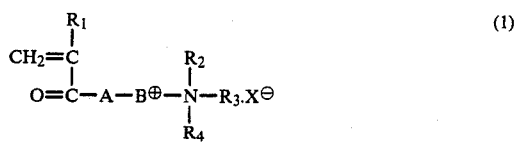

wherein A stnds for an oxygen atom or NH, B for an

TABLE 3

| | | Auxiliary for dewatering | | Results of dewatering test | | | |
|---|---|---|---|---|---|---|---|
| | | Dosage of crushed waste-newspaper (% by weight, based on solids of sludge) | Dosage of METAC polymer (% by weight, based on solids of sludge) | Floc diameter (mm) | Water content of dewatered cake (% by weight) | Ease of separation of dewatered cake (*1) | Clarity of filtrate (*2) |
| Example 3 | 3-1 | 20*3 | 0.8 | 0.3 | 62 | Good | Good |
| | 3-2 | 10*3 | 0.8 | 0.3 | 63 | Good | Good |
| | 3-3 | 5*3 | 0.8 | 0.3 | 66 | Good | Good |
| | 3-4 | 10*3 | 1.2 | 0.5 | 64 | Good | Good |
| Comparative | 3'-1 | — | — | 0.2> | Incapable of filtration | | |
| Experiment 3 | 3'-2 | 20*3 | — | 0.2> | | | |
| | 3'-3 | — | 0.8 | 0.3 | 83 | Bad | Bad |
| | 3'-4 | — | 1.2 | 0.5 | 81 | Bad | Bad |
| | 3'-5 | 20*4 | 0.8 | 0.3 | 77 | Fair | Fair |
| | 3'-6 | Ferric chloride, 10% by weight (based on solids of sludge) Slaked lime, 30% by weight (based on solids of sludge) | | 0.2> | 68 | Good | Good to Fair |

*3 A prescribed amount of crushed waste-newspaper (having bulk specific gravity of 0.03 and water content of 8%) kneaded with added water and then added to the sludge.
*4 The aforementioned crushed waste-newspaper was added in its unmodified to the sludge.
(*1), (*2) Same as in Table 1.

We claim:

1. An auxiliary for dewatering a sludge, comprising a separability improving amount of at least one cationic polymeric flocculant and at least one organic fibrous material having the bulk specific gravity thereof increased to at least 0.3 g/cm³ by being pressed, wherein the weight ratio of said flocculant to said fibrous material is 1:01 to 1:1000, and wherein said fibrous material has a density not more than 0.1 g/cm³ before being pressed.

2. An auxiliary according to claim 1, wherein said fibrous material is a plant fibrous material in the form of fibers or capable of assuming the form of fibers in water.

3. An auxiliary according to claim 2, wherein said plant fibrous material is crushed paper.

4. An auxiliary according to claim 2, wherein said plant fibrous material is waste-paper.

5. An auxiliary according to claim 1, wherein said cationic polymeric flocculant is at least one member selected from the group consisting of:
   (1) a polymer or a copolymer of at least one cationic monomer selected from the group Consisting of tertiary nitrogen-containing acrylates, tertiary nitrogen-containing acrylamides, quaternary nitrogen-containing acrylates, quaternary nitrogen-containing acrylamines, vinyl imidazolines, vinyl pyridines, and allylamines, or a combustion thereof with at least one other ethylenically unsaturated monomer,
   (2) a cationically modified polyacrylamide,
   (3) chitosan,
   (4) a polyethyleneimine,
   (5) an epihalohydrin-amine condensate, and
   (6) a cationized starch.

alkylene group of 1 to 4 carbon atoms, a hyeroxyalkylene group of 2 to 4 carbon atoms, or a phenylene group, $R_1$ for a hydrogen atom or a methyl group, $R_2$, $R_3$, and $R_4$ independently for a hydrogen atom, an alkyl group, or an aralkyl group, and $X^\ominus$ for a counter anion.

7. An auxiliary according to claim 5, wherein said cationic polymeric flocculant has an intrinsic viscosity, $[\eta]$ dl/g satisfying the following equation:

$$6 - C \leq [\eta] \leq 11 - C$$

wherein C is a colloidal equivalent in meq/g and is greater than zero, and $[\eta]$ is measured in an aqueous 1N $NaNO_3$ solution at 30° C. and is greater than zero.

8. An auxdiliary according to claim 1 wherein said fibrous material is pressed in conjunction with said flocculant.

9. An auxiliary according to claim 1 wherein said fibrous material possesses a fiber length in the range of 0.01 to 50 mm.

10. An auxiliary according to claim 1, wherein pressing of said fibrous material is conducted at 100–3,000 kg/cm³.

11. An auxiliary according to claim 1, in the form of pieces having a minor diameter of not more than 10 cm and a major diameter of not more than 1 m.

12. An auxiliary for dewatering a sludge, comprising a separability improving amount of at least one cationic polymeric flocculant and at least one crushed paper having the bulk specific gravity thereof increased to at least 0.3 g/cm³ by being wetted with water in an amount of from about 10 to 100% by weight of water based on the weight of said crushed paper, wherein the weight ratio of said flocculant to said crushed paper is 0:0.1 to 1:1000, and wherein said crushed paper has a density not more than 0.1 g/cm³ before being wetted with water.

13. An auxiliary according to claim 12, in the form of pieces having a minor diameter of not more than 10 cm and a major diameter of not more than 1 m.

14. A method for the manufacture of an auxiliary for dewatering, which method comprises pressing a mixture of a separability improving amount of at least one cationic polymeric flocculant and at least one organic fibrous material in a dry state to a density of at least 0.3 g/cm³, wherein the weight ratio of said flocculant to said fibrous material is 1:01 to 1:1000, and wherein said fibrous material has a density not more than 0.1 g/cm³ before being pressed.

* * * * *